(12) United States Patent
Huang et al.

(10) Patent No.: US 12,341,724 B2
(45) Date of Patent: Jun. 24, 2025

(54) SUB-BAND CHANNEL QUALITY INDICATOR FALLBACK

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 18/048,688

(22) Filed: Oct. 21, 2022

(65) Prior Publication Data

US 2023/0216646 A1 Jul. 6, 2023

Related U.S. Application Data

(60) Provisional application No. 63/266,440, filed on Jan. 5, 2022.

(51) Int. Cl.
*H04L 5/00* (2006.01)

(52) U.S. Cl.
CPC ................... *H04L 5/0057* (2013.01)

(58) Field of Classification Search
CPC ....................................... H04L 5/0057
USPC ........................................... 370/329
See application file for complete search history.

(56) References Cited

U.S. PATENT DOCUMENTS

2015/0236838 A1* 8/2015 Zhang ................... H04W 24/02
455/517
2017/0366998 A1* 12/2017 Lee .......................... H04L 5/00

OTHER PUBLICATIONS

International Search Report and Written Opinion—PCT/US2022/078594—ISA/EPO—Feb. 13, 2023.
LG Electronics: "Discussion on CSI Feedback Enhancements for URLLC", 3GPP TSG RAN WG1 #106bis-e, R1-2109971, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, 3 Pages, Oct. 2, 2021 (Oct. 2, 2021), XP052058907, Section 2, p. 1-p. 2.

(Continued)

*Primary Examiner* — Christopher R Crompton
(74) *Attorney, Agent, or Firm* — QUALCOMM Incorporated (57) ABSTRACT

Various aspects of the present disclosure generally relate to wireless communication. In some aspects, a user equipment (UE) may determine that a set of uplink resources to be used for transmitting a channel state information (CSI) communication is insufficient to permit one or more four-bit sub-band channel quality indicator (CQI) values to be transmitted in the CSI communication. The UE may determine whether the set of uplink resources is sufficient to permit one or more two-bit sub-band differential CQI values to be transmitted in the CSI communication. The UE may selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication. Numerous other aspects are described.

16 Claims, 5 Drawing Sheets

(56) References Cited

OTHER PUBLICATIONS

Qualcomm Incorporated: "Remaining Issues for CSI Enhancement for IIOT and URLLC", 3GPP TSG RAN WG1 #107bis-e, R1-2200297, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 17, 2022-Jan. 25, 2022, 2 Pages, Jan. 11, 2022 (Jan. 11, 2022), XP052098156, Section 2, p. 1.

* cited by examiner

SUB-BAND CHANNEL QUALITY INDICATOR FALLBACK

CROSS-REFERENCE TO RELATED APPLICATION

This patent application claims priority to U.S. Provisional Patent Application No. 63/266,440, filed on Jan. 5, 2022, entitled "SUB-BAND CHANNEL QUALITY INDICATOR FEEDBACK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sub-band channel quality indicator fallback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining that a set of uplink resources to be used for transmitting a channel state information (CSI) communication is insufficient to permit one or more four-bit sub-band channel quality indicator (CQI) values to be transmitted in the CSI communication. The method may include determining, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication. The method may include selectively transmitting the one or more two-bit sub-band differential CQI values in the CSI communication based at least in part on the determination of whether the set of uplink resources is sufficient to permit the one or more two-bit sub-band differential CQI values to be transmitted in the CSI communication.

Some aspects described herein relate to a UE for wireless communication. The UE may include a memory and one or more processors coupled to the memory. The one or more processors may be configured to determine that a set of uplink resources to be used for transmitting a CSI communication is insufficient to permit one or more four-bit sub-band CQI values to be transmitted in the CSI communication. The one or more processors may be configured to determine, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication. The one or more processors may be configured to selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication.

Some aspects described herein relate to a non-transitory computer-readable medium that stores a set of instructions for wireless communication by a UE. The set of instructions, when executed by one or more processors of the UE, may cause the UE to determine that a set of uplink resources to be used for transmitting a CSI communication is insufficient to permit one or more four-bit sub-band CQI values to be transmitted in the CSI communication. The set of instructions, when executed by one or more processors of the UE, may cause the UE to determine, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication. The set of instructions, when executed by one or more processors of the UE, may cause the UE to selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication.

Some aspects described herein relate to an apparatus for wireless communication. The apparatus may include means for determining that a set of uplink resources to be used for transmitting a CSI communication is insufficient to permit one or more four-bit sub-band CQI values to be transmitted in the CSI communication. The apparatus may include means for determining, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication. The apparatus may include means for selectively transmitting the one or more two-bit sub-band differential CQI values in the CSI communication based at least in part on the determination of whether the set of uplink resources is sufficient to permit the one or more two-bit sub-band differential CQI values to be transmitted in the CSI communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
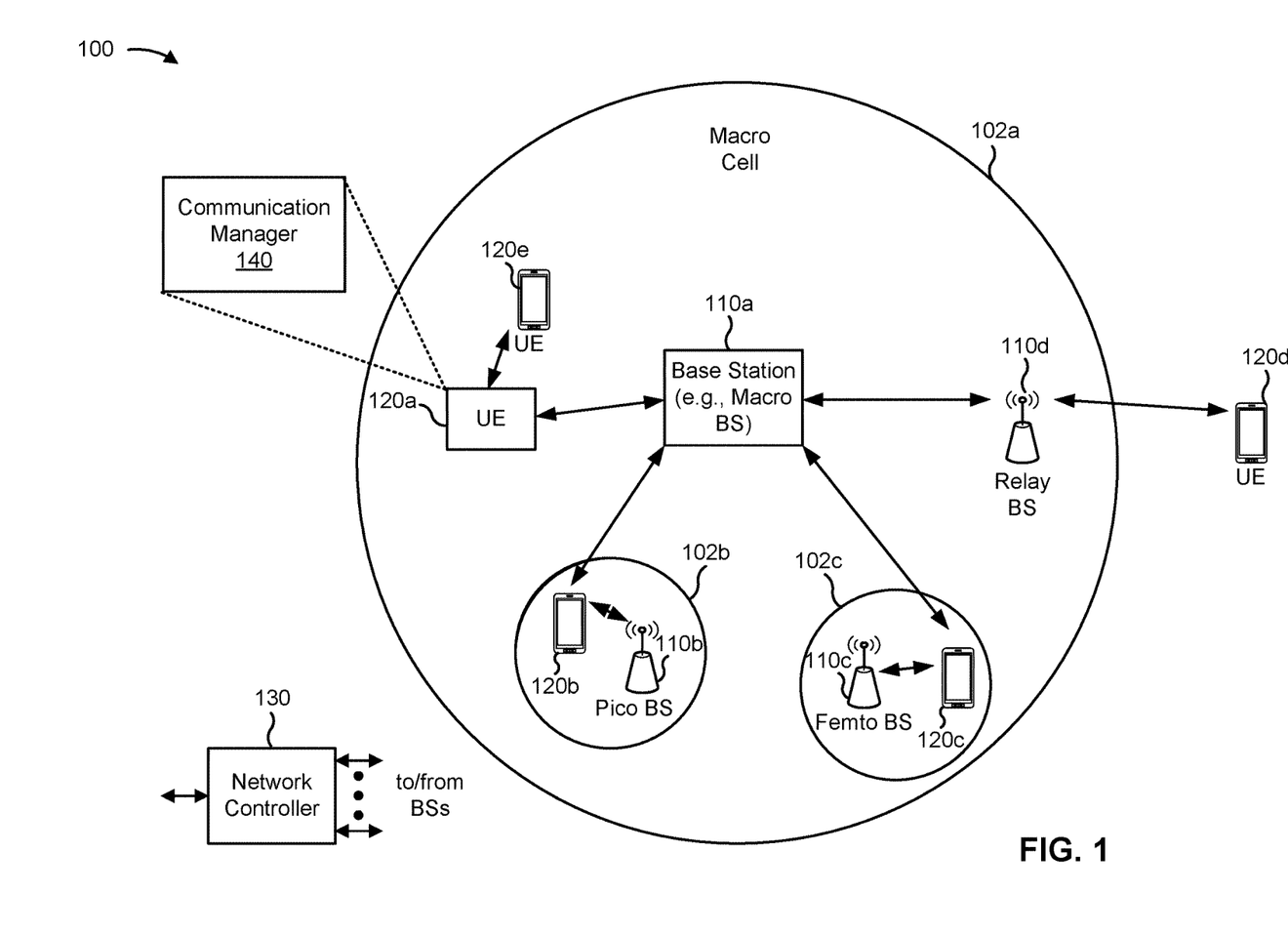
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine that a set of uplink resources to be used for transmitting a CSI communication is insufficient to permit one or more four-bit sub-band CQI values to be transmitted in the CSI communication; determine, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication; and selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication. Additionally, or alternatively, the communication manager 140 may perform one or more other operations described herein.

As indicated above, FIG. 1 is provided as an example. Other examples may differ from what is described with regard to FIG. 1.

Figure 2:
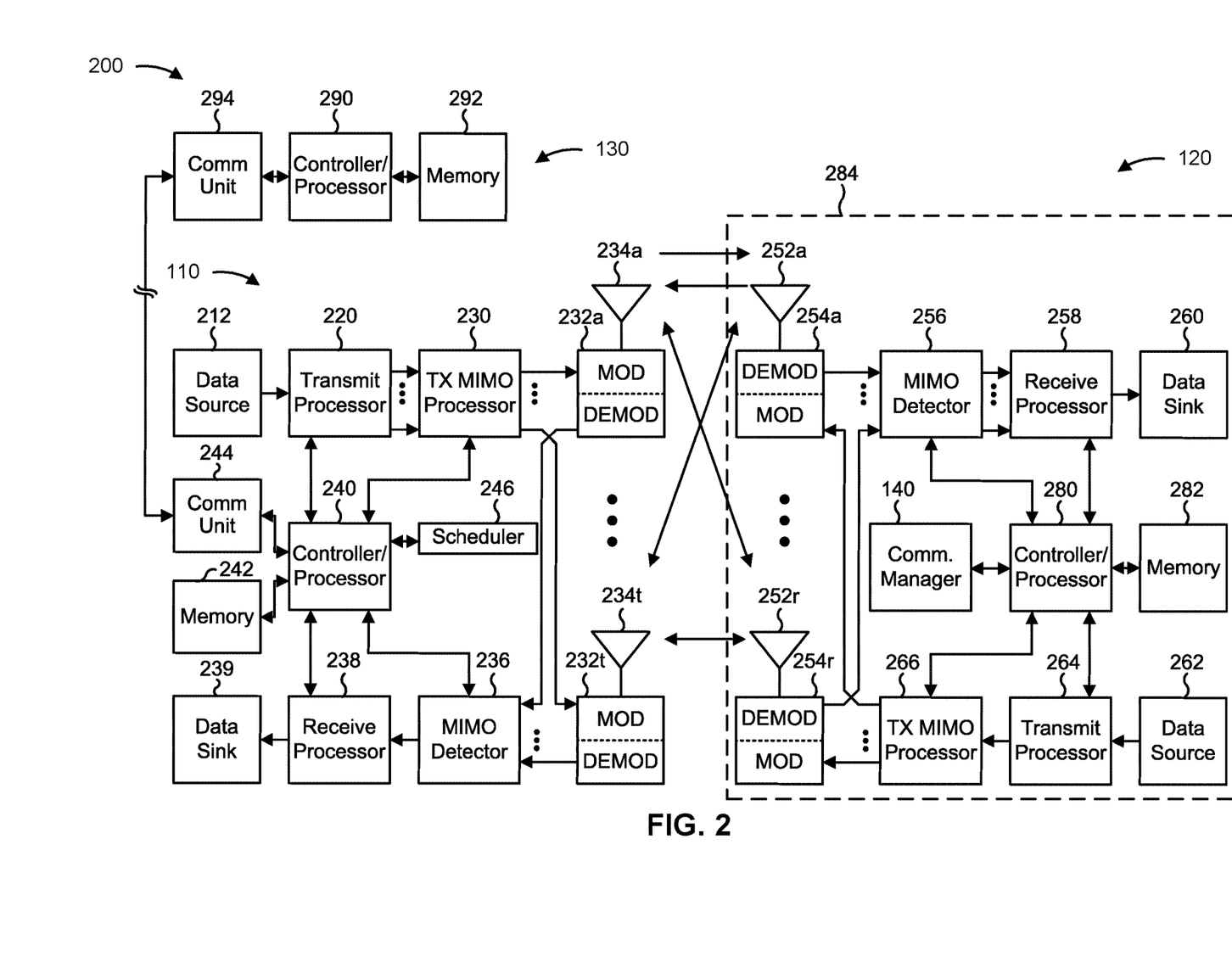
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-5).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-5).

The controller/processor 240 of the base station 110, the controller/processor 280 of the UE 120, and/or any other component(s) of FIG. 2 may perform one or more techniques associated with sub-band CQI fallback, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some examples, executing instructions may include running the instructions, converting the instructions, compiling the instructions, and/or interpreting the instructions, among other examples.

In some aspects, the UE includes means for determining that a set of uplink resources to be used for transmitting a CSI communication is insufficient to permit one or more four-bit sub-band CQI values to be transmitted in the CSI communication; means for determining, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication; and/or means for selectively transmitting the one or more two-bit sub-band differential CQI values in the CSI communication based at least in part on the determination of whether the set of uplink resources is sufficient to permit the one or more two-bit sub-band differential CQI values to be transmitted in the CSI communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A CQI value allows a UE to quantify and report downlink radio channel conditions within a bandwidth part. A CQI value can be reported to a base station using a physical uplink control channel (PUCCH) or a physical uplink shared channel (PUSCH). The CQI value represents a signal-to-interference-plus-noise ratio (rather than a signal strength) and is reported based on a CQI table that corresponds to a set of physical downlink shared channel (PDSCH) MCSs (e.g., a 64 quadrature amplitude modulation (QAM) table, a 256 QAM table, and a low spectral efficiency table). In general, a CQI value is signaled using a set of four bits, which enables the CQI value to be in a range of integer values from 0 to 15. A higher CQI value indicates that the UE is able to receive higher order modulation with a high coding rate (i.e., relatively little channel coding redundancy).

In some wireless communication systems, a base station can request a UE to report wideband or sub-band CQI values. A wideband CQI provides a result which is derived from an entire bandwidth part. In contrast, a sub-band CQI provides a result which is derived from a specific section of bandwidth part (i.e., a sub-band of the bandwidth part). A size of sub-bands within a bandwidth part can be indicated by the base station and can also depend on the size of the bandwidth part. In some cases, a bandwidth part can include many sub-bands (e.g., up to 19 sub-bands). In such a case, if an absolute CQI value is signaled for each sub-band, a signaling payload for reporting CQI values may be undesirably large (e.g., since each sub-band CQI value is reported in four bits).

Therefore, in some wireless communication systems, differential CQI values can be used for sub-band CQI reporting. Typically, the differential CQI value is indicated in two bits (rather than four bits) to reduce signaling payload. A differential sub-band CQI value is defined relative to the wideband CQI value using the following expression:

$$\text{Differential sub-band CQI} = \text{Sub-band CQI offset} = \text{Sub-band CQI} - \text{Wideband CQI}$$

Thus, when the UE is configured to report sub-band CQI feedback, the UE reports a wideband CQI value (used as a reference CQI) and, for each sub-band, the UE reports a difference (i.e., an offset) between a sub-band CQI value and the wideband CQI value. Typically, the difference between the sub-band CQI value and the wideband CQI value is quantized into two bits according to the following table:

| Sub-band differential CQI value | Sub-band CQI offset |
|---|---|
| 0 | 0 |
| 1 | 1 |
| 2 | ≥2 |
| 3 | ≤−1 |

As an example, if a difference between a sub-band CQI value and the wideband CQI value is 0 (e.g., sub-band CQI offset=0), then the sub-band CQI offset is quantized to a sub-band differential CQI value of 0. As another example, if a difference between a sub-band CQI value and the wideband CQI value is 5 (e.g., sub-band CQI offset=5), then the sub-band CQI offset is quantized to a sub-band differential CQI value of 2. As another example, if a difference between a sub-band CQI value and the wideband CQI value is −1 (e.g., sub-band CQI offset=−1), then the sub-band CQI offset is quantized to a sub-band differential CQI value of 3.

Typically, CQI feedback is provided in a CSI report, where the CSI report may be one of multiple CSI reports provided in CSI feedback. In general, a given CSI report can include one or more CQI values, a precoding matrix indicator (PMI), a CSI reference signal (CSI-RS) resource indicator (CRI), a strongest layer indication (SLI), a rank indication (RI), a Layer 1 reference signal received power (L1-RSRP) (e.g., used for beam management), or the like. In some scenarios, the given CSI report is structured to include two parts: a CSI Part 1 including an RI, a CRI, and a first CQI value (e.g., for a first codeword); and a CSI Part 2 including a PMI, an SLI, an L1-RSRP, and a second CQI value (e.g., for a second codeword, when RI is greater than 4). Typically, if the set of uplink resources (e.g., a set of resource elements in the PUCCH or the PUSCH that is to be used for transmitting the CSI feedback) is insufficient to permit all of the content of the CSI feedback to be transmitted, then content of the CSI feedback is omitted or dropped according to a CSI omission rule that defines an ordering of priority levels. The CSI omission rule may, for example, define that CSI Part 2 is omitted first, followed by CSI Part 1; that CSI Part 2 omission follows preconfigured priority levels (e.g., defined in a wireless communication standard); and that CSI Part 1 omission follows priority levels of the CSI reports of the CSI feedback.

In some scenarios, to improve reliability, it is be desirable to permit the sub-band CQI offset to be reported using four bits if possible, and to fallback to reporting using two bits in a scenario when reporting using four bits is not possible. The use of four bits can improve accuracy of CQI feedback and therefore improve reliability, which may be desirable for some types of service (e.g., an ultra-reliable low-latency communication (URLLC) service), while the ability to fallback to two-bit reporting provides flexibility to enable sub-band CQI offsets to be reported even when four-bit reporting is not possible.

Some aspects described herein provide techniques and apparatuses for sub-band CQI fallback. In some aspects, a UE may determine that a set of uplink resources to be used for transmitting a CSI communication is insufficient to permit one or more four-bit sub-band CQI values to be transmitted in the CSI communication. Here, the UE may determine whether the set of uplink resources is sufficient to permit one or more two-bit sub-band differential CQI values to be transmitted in the CSI communication, and may selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication. Additional details are provided below.

Figure 3:
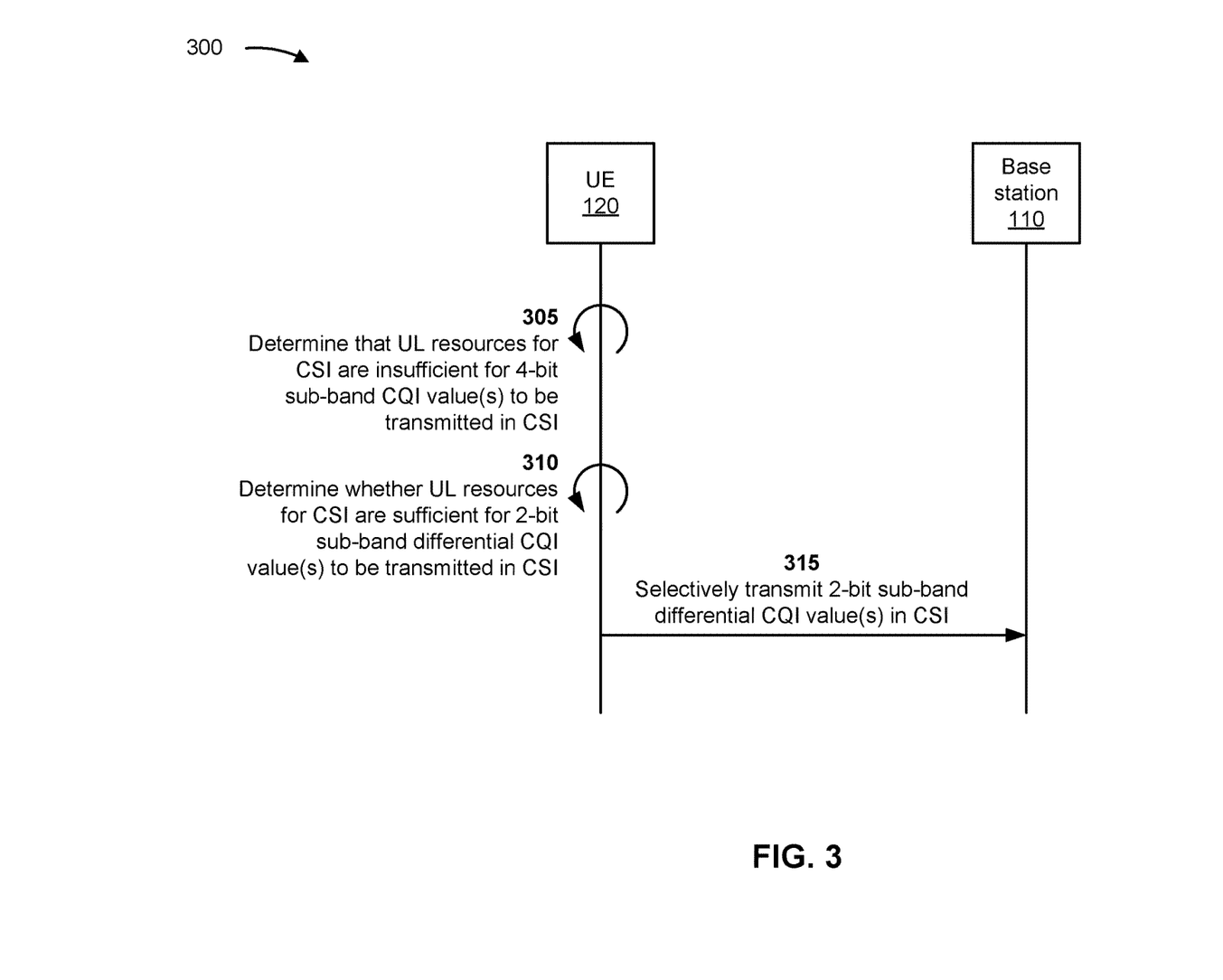
FIG. 3 is a diagram illustrating an example associated with sub-band channel quality indicator (CQI) fallback, in accordance with the present disclosure.

FIG. 3 is a diagram illustrating an example 300 associated with sub-band CQI fallback, in accordance with the present disclosure. As shown in FIG. 3, example 300 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 3, by reference 305, the UE 120 may determine that a set of uplink resources to be used for transmitting a channel state information (CSI) communication is insufficient to permit one or more four-bit sub-band CQI values to be transmitted in the CSI communication. For example, the UE 120 may determine (e.g., based at least in part on a CSI configuration or resource allocation indicated by a base station 110) that a set of resources to be used for transmitting a CSI communication that is to carry sub-band CQI feedback is insufficient to permit one or more four-bit sub-band CQI values to be transmitted. Put another way, the UE 120 may determine that the set of uplink resources to be used for transmitting the CSI communication does not have sufficient resources to enable the UE 120 to transmit four-bit sub-band CQI values. In some aspects, the UE 120 may determine that the set of uplink resources is insufficient for all of multiple four-bit sub-band CQI values (e.g., each associated with a different sub-band) to be transmitted in the CSI communication. That is, in some aspects, the UE 120 may determine that the set of uplink resources is insufficient for all four-bit sub-band CQI values to be transmitted. In some aspects, based at least in part on the determination that the set of uplink resources is insufficient to permit the one or more four-bit sub-band CQI values to be transmitted in the CSI communication, the UE 120 may fallback to two-bit sub-band differential CQI values as described in further detail below.

As shown in FIG. 3, by reference 310, after determining that the set of resources to be used for transmitting the CSI communication is insufficient to permit the one or more four-bit sub-band CQI values to be transmitted, the UE 120 may determine whether the set of uplink resources is sufficient to permit one or more two-bit sub-band differential CQI values to be transmitted in the CSI communication. For example, the UE 120 may determine (e.g., based at least in part on the CSI configuration or the resource allocation indicated by a base station 110) whether the set of resources to be used for transmitting the CSI communication that is to carry sub-band CQI feedback is sufficient to permit one or more two-bit sub-band differential CQI values to be transmitted.

As shown by reference 315, the UE 120 may selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication.

For example, in some aspects, the UE 120 may determine that the set of uplink resources is sufficient to permit the one or more two-bit sub-band differential CQI values to be transmitted in the CSI communication. In such an example, selectively transmitting the one or more two-bit sub-band differential CQI values includes transmitting the one or more two-bit sub-band differential CQI values in the CSI communication. That is, the UE 120 may transmit the one or more two-bit sub-band differential CQI values (e.g., along with a wideband CQI value) in the CSI communication based at least in part on a determination that the set of uplink resources is sufficient to permit the one or more two-bit sub-band differential CQI values to be transmitted in the CSI communication.

As another example, in some aspects, the UE 120 may determine that the set of uplink resources is insufficient to permit the one or more two-bit sub-band differential CQI values to be transmitted in the CSI communication. In some aspects, if the UE 120 determines that the set of uplink resources is insufficient to permit the one or more two-bit sub-band differential CQI values to be transmitted in the CSI communication, then the UE 120 may apply a CSI omission rule associated with reducing a size of the CSI communication, and may transmit the CSI communication after applying the CSI omission rule. In some implementations, the CSI omission rule may define an ordering of priority levels based on which items of information can be omitted from the CSI communication. The CSI omission rule may, for example, define that CSI Part 2 is omitted first, followed by CSI Part 1; that CSI Part 2 omission follows preconfigured priority levels (e.g., defined in a wireless communication standard); and that CSI Part 1 omission follows priority levels of the CSI reports of the CSI feedback.

Additionally, or alternatively, if the UE 120 determines that the set of uplink resources is insufficient to permit the one or more two-bit sub-band differential CQI values to be transmitted in the CSI communication, then the UE 120 may in some aspects may refrain from transmitting one or more items of CSI in the CSI communication. For example, the UE 120 may refrain from transmitting (i.e., may omit) one or more CQI values (e.g., one or more low priority sub-band differential CQI values) based on determining that the set of uplink resources is insufficient to permit the one or more two-bit sub-band differential CQI values from being transmitted in the CSI communication.

In some aspects, the UE 120 may determine whether the set of uplink resources is sufficient for all of multiple two-bit sub-band differential CQI values (e.g., each associated with a different sub-band) to be transmitted in the CSI communication, and may selectively transmit all of the multiple two-bit sub-band differential CQI values accordingly. That is, in some aspects, the UE 120 may determine whether the set of uplink resources is sufficient for all two-bit sub-band differential CQI values to be transmitted and may selectively transmit all of the multiple two-bit sub-band differential CQI values accordingly (e.g., the UE 120 may not transmit any two-bit sub-band differential CQI values when the set of uplink resources is insufficient to transmit all of the two-bit sub-band differential CQI values).

Alternatively, in some aspects, the UE 120 may determine whether the set of uplink resources is sufficient for each of multiple two-bit sub-band differential CQI value to be transmitted in the CSI communication on an individual basis and may selectively transmit each of the multiple two-bit sub-band differential CQI values accordingly. That is, in some aspects, the UE 120 may determine whether the set of uplink resources is sufficient for a first two-bit sub-band differential CQI value to be transmitted, then determine whether a remaining portion of the set of uplink resources is sufficient for a second two-bit sub-band differential CQI value to be transmitted, and so on, and may transmit one or more two-bit sub-band differential CQI values, accordingly (e.g., the UE 120 may transmit individual two-bit sub-band differential CQI values for which there are sufficient uplink resources). In some aspects, an order in which the UE 120 determines whether two-bit sub-band differential CQI values can be transmitted in the set of uplink resources may be based at least in part on priorities of the sub-bands of the bandwidth part.

As indicated above, FIG. 3 is provided as an example. Other examples may differ from what is described with respect to FIG. 3.

Figure 4:
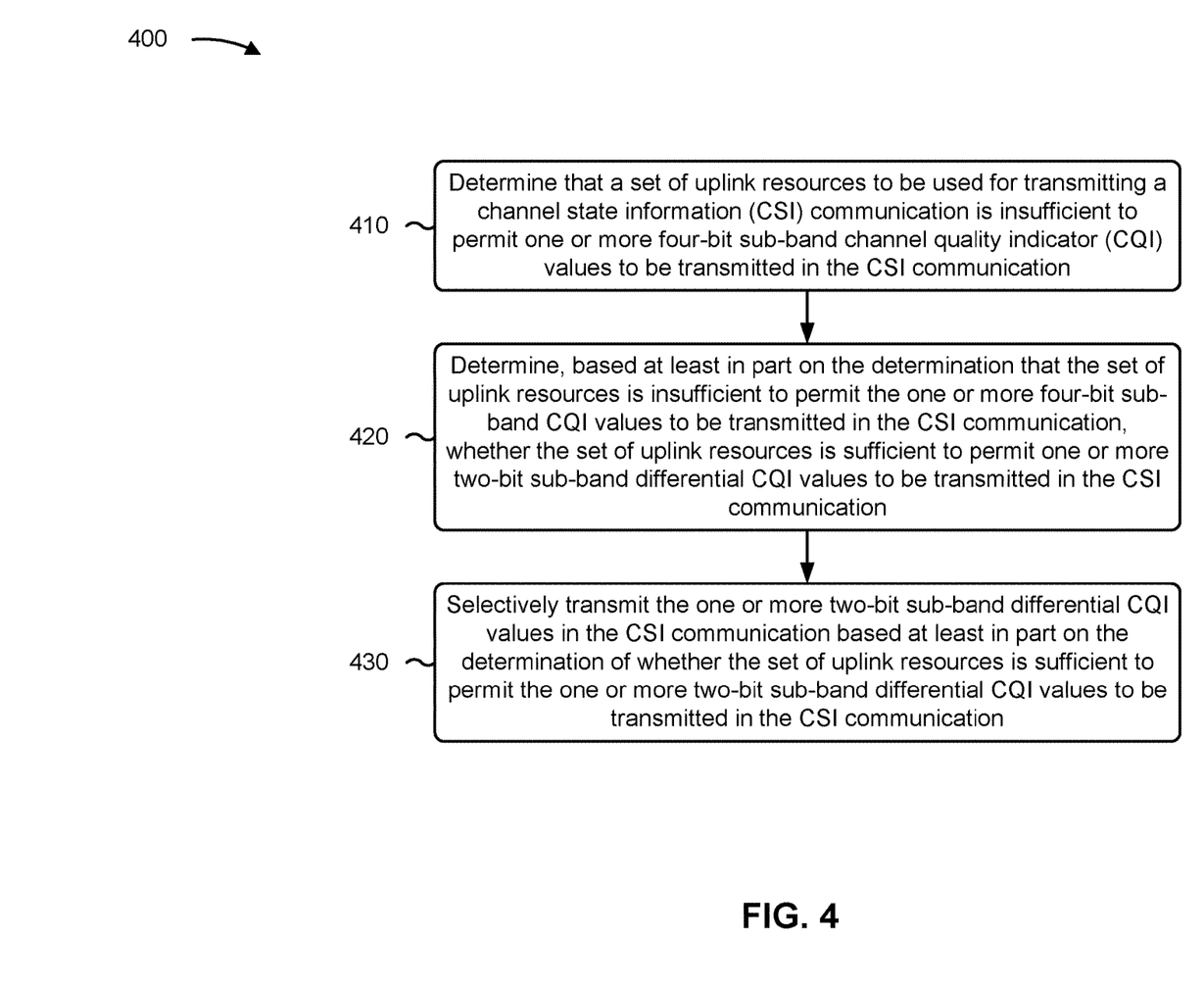
FIG. 4 is a diagram illustrating an example process associated with sub-band CQI fallback, in accordance with the present disclosure.

FIG. 4 is a diagram illustrating an example process 400 performed, for example, by a UE, in accordance with the present disclosure. Example process 400 is an example where the UE (e.g., UE 120) performs operations associated with sub-band CQI fallback.

As shown in FIG. 4, in some aspects, process 400 may include determining that a set of uplink resources to be used for transmitting a CSI communication is insufficient to permit one or more four-bit sub-band CQI values to be transmitted in the CSI communication (block 410). For example, the UE (e.g., using communication manager 140 and/or CQI fallback component 508, depicted in FIG. 5) may determine that a set of uplink resources to be used for transmitting a CSI communication is insufficient to permit one or more four-bit sub-band CQI values to be transmitted in the CSI communication, as described above.

As further shown in FIG. 4, in some aspects, process 400 may include determining, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication (block 420). For example, the UE (e.g., using communication manager 140 and/or CQI fallback component 508, depicted in FIG. 5) may determine, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication, as described above.

As further shown in FIG. 4, in some aspects, process 400 may include selectively transmitting the one or more two-bit sub-band differential CQI values in the CSI communication based at least in part on the determination of whether the set of uplink resources is sufficient to permit the one or more two-bit sub-band differential CQI values to be transmitted in the CSI communication (block 430). For example, the UE (e.g., using communication manager 140, CQI fallback component 508, and/or transmission component 504, depicted in FIG. 5) may selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication, as described above.

Process 400 may include additional aspects, such as any single aspect or any combination of aspects described below and/or in connection with one or more other processes described elsewhere herein.

In a first aspect, selectively transmitting the one or more two-bit sub-band differential CQI values comprises transmitting the one or more two-bit sub-band differential CQI values in the CSI communication based at least in part on a determination that the set of uplink resources is sufficient to permit the one or more two-bit sub-band differential CQI values to be transmitted in the CSI communication.

In a second aspect, alone or in combination with the first aspect, selectively transmitting the one or more two-bit sub-band differential CQI values comprises applying a CSI omission rule associated with reducing a size of the CSI communication based at least in part on a determination that the set of uplink resources is insufficient to permit the one or more two-bit sub-band differential CQI values to be transmitted in the CSI communication, and transmitting the CSI communication after applying the CSI omission rule.

In a third aspect, alone or in combination with one or more of the first and second aspects, selectively transmitting the one or more two-bit sub-band differential CQI values comprises refraining from transmitting one or more items of CSI in the CSI communication based at least in part on a determination that the set of uplink resources is insufficient to permit the one or more two-bit sub-band differential CQI values to be transmitted in the CSI communication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
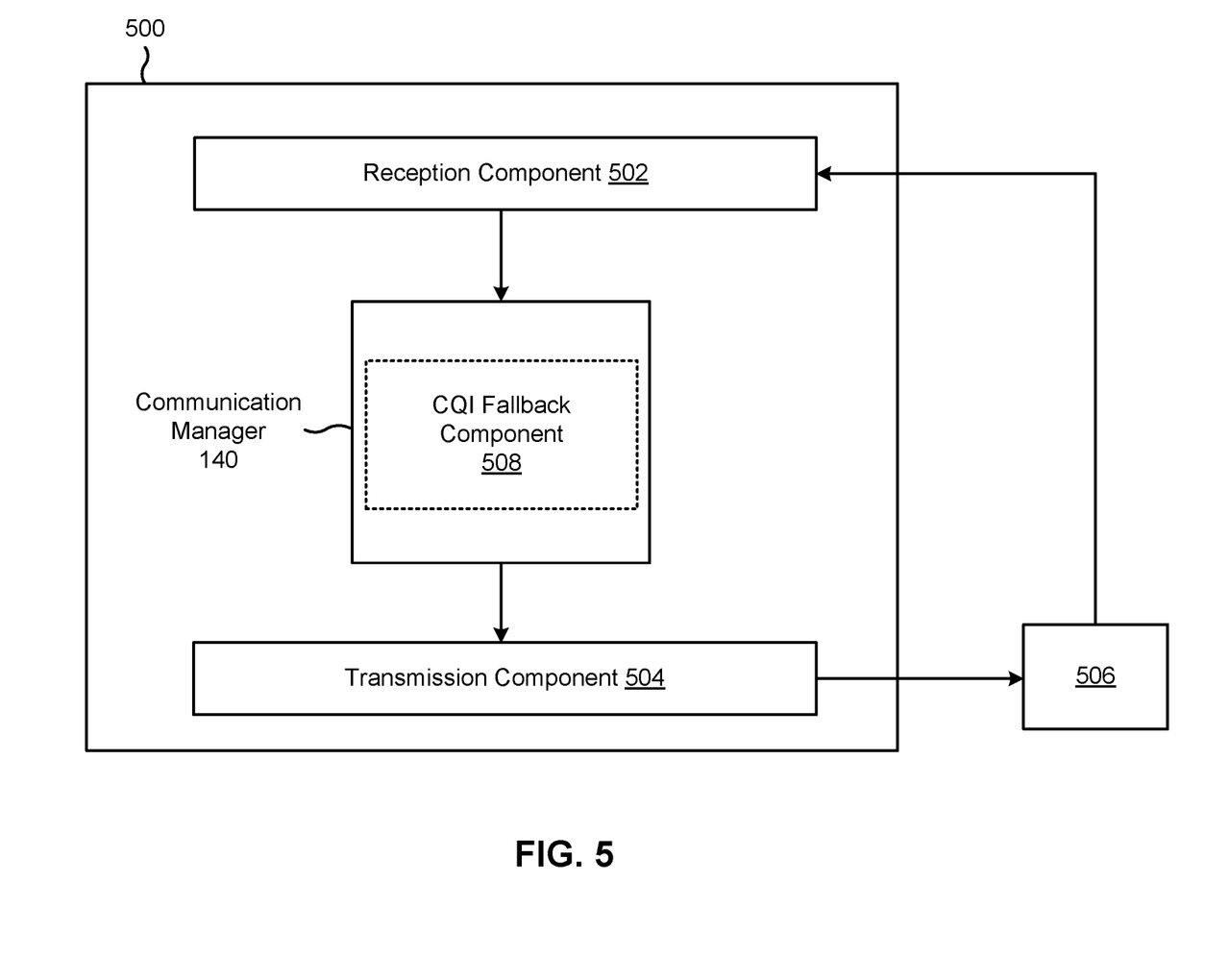
FIG. 5 is a diagram of an example apparatus for wireless communication, in accordance with the present disclosure.

FIG. 5 is a diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include the communication manager 140. The communication manager 140 may include a CQI fallback component 508, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4, or a combination thereof. In some aspects, the apparatus 500 and/or one or more components shown in FIG. 5 may include one or more components of the UE described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 500. In some aspects, the reception component 502 may include one or more antennas, a modem, a demodulator, a MIMO detector, a receive processor, a controller/processor, a memory, or a combination thereof, of the UE described in connection with FIG. 2.

The transmission component 504 may transmit communications, such as reference signals, control information, data communications, or a combination thereof, to the apparatus 506. In some aspects, one or more other components of the apparatus 500 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modem, a modulator, a transmit MIMO processor, a transmit processor, a controller/processor, a memory, or a combination thereof, of the UE described in connection with FIG. 2. In some aspects, the transmission component 504 may be co-located with the reception component 502 in a transceiver.

The CQI fallback component 508 may determine that a set of uplink resources to be used for transmitting a CSI communication is insufficient to permit one or more four-bit sub-band CQI values to be transmitted in the CSI communication. The CQI fallback component 508 may determine, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication. The CQI fallback component 508 may selectively transmit, or may cause the transmission component 504 to selectively transmit, the one or more two-bit sub-band differential CQI values in the CSI communication based at least in part on the determination of whether the set of uplink resources is sufficient to permit the one or more two-bit sub-band differential CQI values to be transmitted in the CSI communication.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a UE, comprising: determining that a set of uplink resources to be used for transmitting a CSI communication is insufficient to permit one or more four-bit sub-band CQI values to be transmitted in the CSI communication; determining, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication; and selectively transmitting the one or more two-bit sub-band differential CQI values in the CSI communication based at least in part on the determination of whether the set of uplink resources is sufficient to permit the one or more two-bit sub-band differential CQI values to be transmitted in the CSI communication.

Aspect 2: The method of Aspect 1, wherein selectively transmitting the one or more two-bit sub-band differential CQI values comprises: transmitting the one or more two-bit sub-band differential CQI values in the CSI communication based at least in part on a determination that the set of uplink resources is sufficient to permit the one or more two-bit sub-band differential CQI values to be transmitted in the CSI communication.

Aspect 3: The method of Aspect 1, wherein selectively transmitting the one or more two-bit sub-band differential CQI values comprises: applying a CSI omission rule associated with reducing a size of the CSI communication based at least in part on a determination that the set of uplink resources is insufficient to permit the one or more two-bit sub-band differential CQI values to be transmitted in the CSI communication, and transmitting the CSI communication after applying the CSI omission rule.

Aspect 4: The method of Aspect 1, wherein selectively transmitting the one or more two-bit sub-band differential CQI values comprises: refraining from transmitting one or more items of CSI in the CSI communication based at least in part on a determination that the set of uplink resources is insufficient to permit the one or more two-bit sub-band differential CQI values to be transmitted in the CSI communication.

Aspect 5: An apparatus for wireless communication at a device, comprising a processor; memory coupled with the processor; and instructions stored in the memory and executable by the processor to cause the apparatus to perform the method of one or more of Aspects 1-4.

Aspect 6: A device for wireless communication, comprising a memory and one or more processors coupled to the memory, the one or more processors configured to perform the method of one or more of Aspects 1-4.

Aspect 7: An apparatus for wireless communication, comprising at least one means for performing the method of one or more of Aspects 1-4.

Aspect 8: A non-transitory computer-readable medium storing code for wireless communication, the code comprising instructions executable by a processor to perform the method of one or more of Aspects 1-4.

Aspect 9: A non-transitory computer-readable medium storing a set of instructions for wireless communication, the set of instructions comprising one or more instructions that, when executed by one or more processors of a device, cause the device to perform the method of one or more of Aspects 1-4.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      determine that a set of uplink resources to be used for transmitting a channel state information (CSI) communication is insufficient to permit one or more four-bit sub-band channel quality indicator (CQI) values to be transmitted in the CSI communication;
      determine, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication; and
      selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication.

2. The UE of claim 1, wherein the one or more processors, to selectively transmit the one or more two-bit sub-band differential CQI values, are configured to:
   transmit the one or more two-bit sub-band differential CQI values in the CSI communication based at least in part on a determination that the set of uplink resources is sufficient to permit the one or more two-bit sub-band differential CQI values to be transmitted in the CSI communication.

3. The UE of claim 1, wherein the one or more processors, to selectively transmit the one or more two-bit sub-band differential CQI values, are configured to:
   apply a CSI omission rule associated with reducing a size of the CSI communication based at least in part on a determination that the set of uplink resources is insufficient to permit the one or more two-bit sub-band differential CQI values to be transmitted in the CSI communication, and
   transmit the CSI communication after applying the CSI omission rule.

4. The UE of claim 1, wherein the one or more processors, to selectively transmit the one or more two-bit sub-band differential CQI values, are configured to:
   refrain from transmitting one or more items of CSI in the CSI communication based at least in part on a determination that the set of uplink resources is insufficient to permit the one or more two-bit sub-band differential CQI values to be transmitted in the CSI communication.

5. A method of wireless communication performed by a user equipment (UE), comprising:
   determining that a set of uplink resources to be used for transmitting a channel state information (CSI) communication is insufficient to permit one or more four-bit sub-band channel quality indicator (CQI) values to be transmitted in the CSI communication;
   determining, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication; and
   selectively transmitting the one or more two-bit sub-band differential CQI values in the CSI communication based at least in part on the determination of whether the set of uplink resources is sufficient to permit the one or more two-bit sub-band differential CQI values to be transmitted in the CSI communication.

6. The method of claim 5, wherein selectively transmitting the one or more two-bit sub-band differential CQI values comprises:
   transmitting the one or more two-bit sub-band differential CQI values in the CSI communication based at least in part on a determination that the set of uplink resources is sufficient to permit the one or more two-bit sub-band differential CQI values to be transmitted in the CSI communication.

7. The method of claim 5, wherein selectively transmitting the one or more two-bit sub-band differential CQI values comprises:
   applying a CSI omission rule associated with reducing a size of the CSI communication based at least in part on a determination that the set of uplink resources is insufficient to permit the one or more two-bit sub-band differential CQI values to be transmitted in the CSI communication, and transmitting the CSI communication after applying the CSI omission rule.

8. The method of claim 5, wherein selectively transmitting the one or more two-bit sub-band differential CQI values comprises:

refraining from transmitting one or more items of CSI in the CSI communication based at least in part on a determination that the set of uplink resources is insufficient to permit the one or more two-bit sub-band differential CQI values to be transmitted in the CSI communication.

9. A non-transitory computer-readable medium storing a set of instructions for wireless communication, the set of instructions comprising:

one or more instructions that, when executed by one or more processors of a user equipment (UE), cause the UE to:
determine that a set of uplink resources to be used for transmitting a channel state information (CSI) communication is insufficient to permit one or more four-bit sub-band channel quality indicator (CQI) values to be transmitted in the CSI communication;
determine, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication; and
selectively transmit the one or more two-bit sub-band differential CQI values in the CSI communication based at least in part on the determination of whether the set of uplink resources is sufficient to permit the one or more two-bit sub-band differential CQI values to be transmitted in the CSI communication.

10. The non-transitory computer-readable medium of claim 9, wherein the one or more instructions, that cause the UE to selectively transmit the one or more two-bit sub-band differential CQI values, cause the UE to:

transmit the one or more two-bit sub-band differential CQI values in the CSI communication based at least in part on a determination that the set of uplink resources is sufficient to permit the one or more two-bit sub-band differential CQI values to be transmitted in the CSI communication.

11. The non-transitory computer-readable medium of claim 9, wherein the one or more instructions, that cause the UE to selectively transmit the one or more two-bit sub-band differential CQI values, cause the UE to:

apply a CSI omission rule associated with reducing a size of the CSI communication based at least in part on a determination that the set of uplink resources is insufficient to permit the one or more two-bit sub-band differential CQI values to be transmitted in the CSI communication, and
transmit the CSI communication after applying the CSI omission rule.

12. The non-transitory computer-readable medium of claim 9, wherein the one or more instructions, that cause the UE to selectively transmit the one or more two-bit sub-band differential CQI values, cause the UE to:

refrain from transmitting one or more items of CSI in the CSI communication based at least in part on a determination that the set of uplink resources is insufficient to permit the one or more two-bit sub-band differential CQI values to be transmitted in the CSI communication.

13. An apparatus for wireless communication, comprising:

means for determining that a set of uplink resources to be used for transmitting a channel state information (CSI) communication is insufficient to permit one or more four-bit sub-band channel quality indicator (CQI) values to be transmitted in the CSI communication;
means for determining, based at least in part on the determination that the set of uplink resources is insufficient to permit the one or more four-bit sub-band CQI values to be transmitted in the CSI communication, whether the set of uplink resources is sufficient to permit one or more two-bit sub-band differential CQI values to be transmitted in the CSI communication; and
means for selectively transmitting the one or more two-bit sub-band differential CQI values in the CSI communication based at least in part on the determination of whether the set of uplink resources is sufficient to permit the one or more two-bit sub-band differential CQI values to be transmitted in the CSI communication.

14. The apparatus of claim 13, wherein the means for selectively transmitting the one or more two-bit sub-band differential CQI values comprises:

means for transmitting the one or more two-bit sub-band differential CQI values in the CSI communication based at least in part on a determination that the set of uplink resources is sufficient to permit the one or more two-bit sub-band differential CQI values to be transmitted in the CSI communication.

15. The apparatus of claim 13, wherein the means for selectively transmitting the one or more two-bit sub-band differential CQI values comprises:

means for applying a CSI omission rule associated with reducing a size of the CSI communication based at least in part on a determination that the set of uplink resources is insufficient to permit the one or more two-bit sub-band differential CQI values to be transmitted in the CSI communication, and
means for transmitting the CSI communication after applying the CSI omission rule.

16. The apparatus of claim 13, wherein the means for selectively transmitting the one or more two-bit sub-band differential CQI values comprises:

means for refraining from transmitting one or more items of CSI in the CSI communication based at least in part on a determination that the set of uplink resources is insufficient to permit the one or more two-bit sub-band differential CQI values to be transmitted in the CSI communication.

* * * * *